United States Patent Office 3,004,065
Patented Oct. 10, 1961

3,004,065
PREPARATION OF ALKYLGUANIDINE SALTS
George N. Gagliardi, Springdale, Conn., assignor to American Cyanamid Company, New York, N.Y., a corporation of Delaware
No Drawing. Filed Nov. 29, 1957, Ser. No. 699,518
3 Claims. (Cl. 260—501)

The present invention relates to the production of long-chain n-alkylguanidine salts. More particularly it concerns a process improvement whereby they are obtainable in better yields and quality.

The production of such salts is not unique in the art. Several methods are presently available which enable the synthesis of acid salts of alkyl-substituted guanidines. One of the best is disclosed by Paden and MacLean in U.S. Patent No. 2,425,341. Therein, in an aqueous alkaline medium (pH 9–11), cyanamine is caused to react with an alkyl amine in the presence of an acid and/or an acid salt of said amine.

However, commercial scale production in accordance with the Paden-MacLean process of long-chain n-alkylguanidine salts, i.e., those in which the n-alkyl group contains ten or more carbon atoms, is not wholly satisfactory. Yields are inexplicably low in quantity or quality. If these difficulties could be overcome, it would greatly extend the utility of this general process. To do so is the principal object of this invention.

This result has been successfully accomplished as a result of an unexpected discovery. According to the present invention, it has been found that dissolved iron caused by the presence of iron impurities in the reaction mixture lowers not only the purity but also the yield of the product. It is therefore essential that the raw materials utilized in the process be substantially free of iron.

In general, it will be found that the principal source of troublesome iron in the mixture is the cyanamide reactant. As available in commercial form, the acid and the amine will usually be found of satisfactory quality with respect to iron impurities. Cyanamide, whether dissolved in the operation or used as commercially-available solutions may vary widely in minor content of iron.

Care should be taken to avoid contamination. The cyanamide solution should contain less than 300 parts per million (p.p.m.) of iron and if possible less than 100 p.p.m. of iron. Although this is specified as to the cyanamide solution, it should be realized that the same limits apply to the whole aqueous reaction mixture. Apparatus used sould not result in exceeding these limits.

Production of n-dodecylguanidine acetate presents all the typical problems of the present invention. It may and therefore will be taken as illustrative in discussing the invention in greater detail by means of the following specific examples in which aqueous cyanamide solutions containing varying amounts of iron are utilized.

EXAMPLE I

Seventy-five pounds of dodecylamine (95% purity) and 175 pounds of water were charged to a closed reactor at room temperature. The mixture was heated with agitation to about 70° C., and 13.5 pounds of glacial acetic acid were added. An exotherm to about 85° C. followed, and at this temperature 10 cc. of a commercial silicone antifoam agent (Dow Corning Antifoam Emulsion A) were added. Heating was continued to 95° C., and a mixture of 7.2 pounds of glacial acetic acid and 103.5 pounds of 25% aqueous cyanamide solution was added during a period of about one hour. The reaction mixture was then heated at 98–100° C. for 2.5 hours, and adjusted to about pH 8 by the addition of approximately one pound of glacial acetic acid.

The product was isolated by adding 188 pounds of water and 5.6 pounds of glacial acetic acid to the reaction mixture, cooling the resultant solution to 20° C., and filtering off the precipitated crystals.

After water washing, 55.4 pounds of dodecylguanidine acetate were obtained. Analysis of the cyanamide reactant solution showed a dissolved iron content of about 9050 parts per million. The purity of the product was 73.9%, and the yield 37.1% based on the weight of dodecylamine.

EXAMPLES II–VI

Example I was repeated five times. In each run substantially identical conditions to those of Example I were maintained so far as possible, with one exception. In each case the cyanamide solution contained a different amount of dissolved iron. Illustrative results, together with those of Example I, are set forth for comparison in the following table.

Table

| Example | Iron Concentration (p.p.m.) | | Dodecylguanidine acetate | |
|---|---|---|---|---|
| | Cyanamide Sol'n | Total Reaction Mass | Percent Yield | Percent Purity |
| 1 | 9,050 | 2,510 | 37.1 | 73.9 |
| 2 | 1,180 | 327 | 57.0 | 92.0 |
| 3 | 300 | 83 | 75.6 | 92.2 |
| 4 | 145 | 40 | 76.4 | 94.8 |
| 5 | 120 | 33 | 79.5 | 95.2 |
| 6 | 4 | 1 | 80.0 | 96.6 |

From these results which are typical of many, the remarkable effect of dissolved iron on the process and its product is readily seen.

I claim:
1. In the preparation of a salt of an alkyl guanidine by the process which comprises forming a mixture comprising water, a primary alkyl amine containing 10 or more carbon atoms and an acid salt of said amine, adding thereto a mixture of the acid corresponding to said acid salt and an aqueous solution of cyanamide, keeping the resultant mixture at a pH of at least about nine by the addition of said acid corresponding to said acid salt and holding the temperature of the mixture between about 95° C. and 100° C. until reaction substantially ceases, the improvement in combination therewith in which an aqueous cyanamide solution having a dissolved iron content of less than 300 parts per million is employed and said resultant reaction mixture has, throughout the reaction, a dissolved iron content of less than about 100 parts per million.

2. In the preparation of a salt of dodecylguanidine by the process which comprises forming a mixture comprising water, dodecylamine and an acid salt of dodecylamine, adding thereto a mixture of the acid corresponding to said acid salt and an aqueous solution of cyanamide, keeping the resultant mixture at a pH of at least about nine by the addition of said acid and holding the temperature of said mixture between about 95° and 100° C. until reaction substantially ceases, the improvement in combination therewith in which an aqueous cyanamide solution having a dissolved iron content of less than 300 parts per million is employed and said resultant reaction mixture has, throughout the reaction, a dissolved iron content of less than 100 parts per million.

3. In a process for preparing dodecylguanidine acetate which comprises forming a mixture comprising water, acetic acid and dodecylamine, adding thereto a mixture of acetic acid and an aqueous solution of cyanamide, keeping the resultant mixture at a pH of at least about nine by the addition of acetic acid and holding the temperature of said mixture between about 95° and 100° C. until reaction substantially ceases, the improvement in combination therewith in which an aqueous cyanamide solution having a dissolved iron content of less than 300 parts per million is employed and said resultant reaction mixture has, throughout the reaction, a dissolved iron content of less than about 100 parts per million.

References Cited in the file of this patent

UNITED STATES PATENTS 2,425,341    Paden et al. _____ Aug. 12, 1947

FOREIGN PATENTS 260,564    Switzerland _____ July 16, 1949
467,342    Canada _____ Aug. 15, 1950

UNITED STATES PATENT OFFICE
CERTIFICATE OF CORRECTION

Patent No. 3,004,065                              October 10, 1961

George N. Gagliardi

It is hereby certified that error appears in the above numbered patent requiring correction and that the said Letters Patent should read as corrected below.

Column 2, line 58, strike out "at least"; line 59, after "acid" insert -- corresponding to said acid salt --.

Signed and sealed this 1st day of May 1962.

(SEAL)
Attest:

ERNEST W. SWIDER
Attesting Officer

DAVID L. LADD
Commissioner of Patents